J. E. HALLETT.
VEHICLE WHEEL.
APPLICATION FILED FEB. 27, 1907.
916,551.
Patented Mar. 30, 1909.
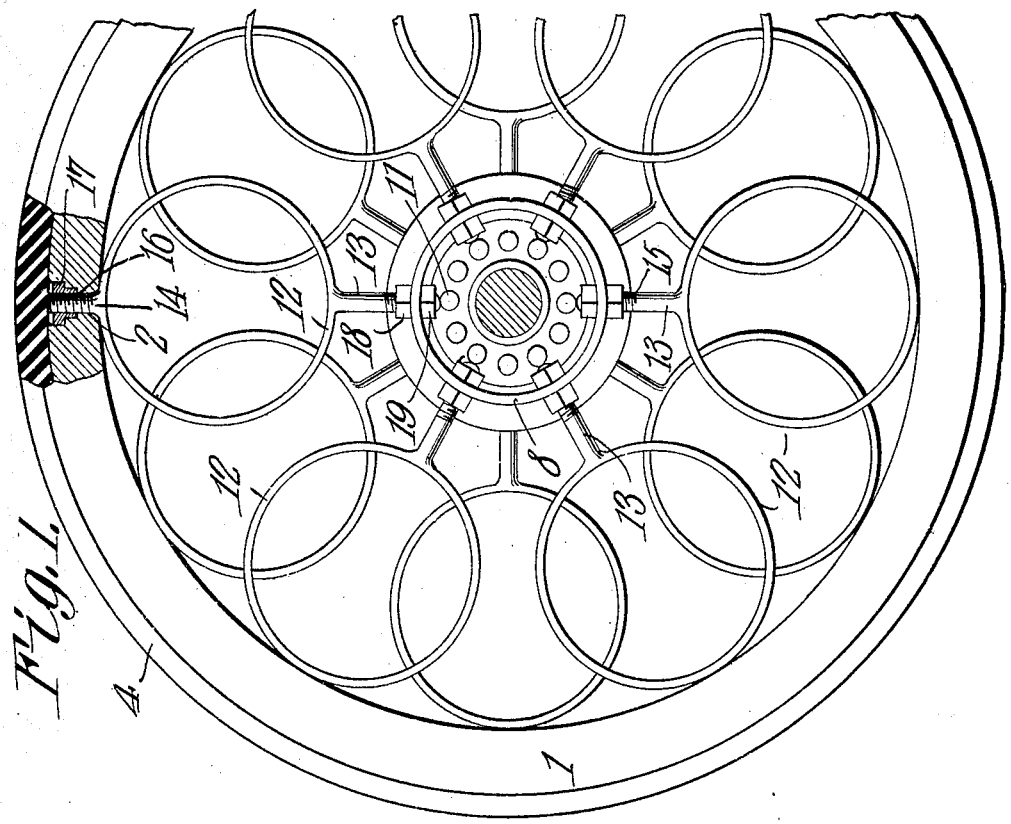
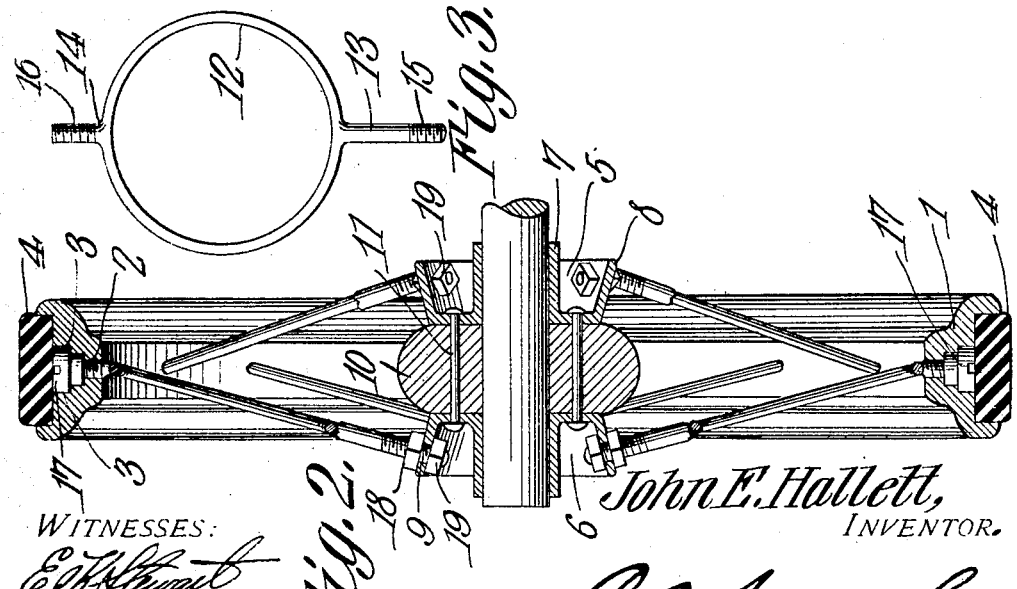

UNITED STATES PATENT OFFICE.

JOHN EMORY HALLETT, OF LONGBEACH, CALIFORNIA.

VEHICLE-WHEEL.

No. 916,551.  Specification of Letters Patent.  Patented March 30, 1909.

Application filed February 27, 1907. Serial No. 359,574.

*To all whom it may concern:*

Be it known that I, JOHN E. HALLETT, a citizen of the United States, residing at Longbeach, in the county of Los Angeles and State of California, have invented a new and useful Vehicle-Wheel, of which the following is a specification.

The present invention relates to improvements in wheels adapted for use on vehicles of various descriptions, and is especially adapted to be employed on automobiles, bicycles, and other vehicles where it is desirable to obtain resiliency of support for the vehicle body that will insure smooth running thereof with a minimum shock due to irregularities in the surface of the road, and to secure comfort for those carried by the vehicle, and it has for its object to provide a wheel for filling these requirements that obviates the necessity of employing a pneumatic tire, the cost of maintenance of which is usually an annoyance to the user.

To these and other ends, the invention consists in certain improvements and combinations and arrangements of parts, all as will be hereinafter more fully described, and set forth in the claim at the end of this specification.

In the accompanying drawing, Figure 1 is a side elevation of a vehicle wheel constructed in accordance with my present invention, the outer attaching end of one of the spokes being shown. Fig. 2 represents a section taken on one of the diameters of the wheel. Fig. 3 is a detail view of one of the spokes detached from the wheel.

Similar parts in the several views are designated by the same numerals of reference.

A vehicle wheel constructed in accordance with my present invention embodies generally a hub of any preferred form, and a rim, the latter being provided preferably with a suitable tire, which may be solid or non-resilient, and the cushioning devices which provide the resiliency of the wheel are interposed between the hub and rim and they embody generally a set of spokes so constructed as to be yieldable in the direction of their length as well as laterally thereof and are so constructed that they may be applied to the hub and rim in a manner similar to that employed for the ordinary wire spoke, so that the improved spoke could be applied interchangeably on wheels of the regular form now in use, avoiding the necessity of employing a specially constructed wheel.

The invention is shown in the present embodiment as applied to a wheel embodying a rim 1 provided with a set of radially arranged apertures 2 adapted to receive the outer ends of the spokes, recesses 3 being provided to accommodate the spoke attaching nut, and the periphery of the rim is appropriately formed to receive and secure a tire 4, the latter being, in the present instance, a solid tire, and it may be composed of rubber, rawhide, or even metal in some cases. The hub embodies a pair of reversely arranged flange members 5 and 6 each composed of a hub portion 7, a flaring flange 8 having a series of apertures 9 to receive the inner attaching end of the spokes, and these flange members are locked together on opposite sides of an intermediate core 10 by means of rivets or bolts 11. However, as has been previously stated, the hub may be of any desired construction. The spokes, which afford the desired resiliency between the hub and rim, embody, in the present instance, an intermediate spring portion 12, the latter being loop-shaped or circular and endless in the form shown and provided with inner and outer attaching portions 13 and 14 which extend outwardly from the outer sides of the spring portion and preferably in a direction diametrically thereof. These attaching portions are rigidly attached to the spring portion and are preferably formed integrally therewith, and they are adapted for attachment to the hub and rim, respectively, by means of the threaded portions 15 and 16 adapted to engage in the apertures 9 and 2 of the hub and rim, respectively. The outer attaching end of the spoke is secured in the rim by the nut 17, which serves to firmly seat the outer side of the looped spring against the rim, and the inner attaching end is rigidly secured to the flange 8 of its respective flange member by means of nuts 18 and 19 engaging on opposite sides of the flange to lock the inner end of the spoke from longitudinal movement and to provide a rigid attachment therefor that will prevent bending of the inner end of the spoke. This latter feature is advantageous when the wheel is applied to a power driven vehicle, as the turning effort applied to the flange members of the hub will be transmitted to the spokes by means of the rigid connection thus provided, and the spokes in turn will transmit the power from the hub to the wheel rim without liability of bending unduly.

By providing the spokes with the resilient or spring portion that affords a yielding action in the direction of their length both under pressure and tension, the weight of the hub will be sustained by the greater number of the spokes of the wheel, those below the horizontal diameter of the wheel being under compression while those above it will be under tension, all of the spokes coöperating to maintain the hub properly centered, and irregularities in the surface of the road, which will produce a vibratory movement on the wheel rim will be absorbed by the resilient or spring portion of the spokes, so that the shock to the vehicle body will be reduced or eliminated, and the novel construction of the spokes not only enables them to be applied to wheels of the type adapted to receive the ordinary wire spokes, but it also provides an efficient attachment for both ends of the spokes that will prevent their displacement, and provides also convenient means for adjustment of the spokes to properly center the rim relatively to the hub.

A vehicle wheel constructed in accordance with the present invention avoids the necessity of employing pneumatic tires, the first cost of which is high and the expense and inconvenience of repair is very objectionable, and the novel construction employed is not subject to wear, there being no friction between the parts as is true of many devices of this general class, while, as previously stated, the novel form of the spokes enables them to be applied to wheels adapted for the usual wire spokes, so that they may be used interchangeably therewith, avoiding the necessity of designing and constructing a special wheel and thereby cheapening the cost of the wheel so that it may be sold at a price that will compare favorably with that of wheels equipped with the usual pneumatic tire.

By constructing the hub in the manner shown and described it is possible by using cores of different thicknesses to adapt the hubs to wheels of different sizes. The flange members 5 and 6 are separate from each other and can therefore be fastened to cores of different sizes thus doing away with the necessity of manufacturing hubs in standard sizes for use in connection with wheels of different sizes. Importance is attached to the fact that each spoke has its ring and attaching portions formed in a single piece so that there are no parts to become detached and the spokes can be quickly and securely fastened in position. By having the rings bear directly against the rim of the wheel said rings will flatten thereon in proportion to the weight to which the wheel is subjected and said weight will thus be correspondingly distributed through the flattened portions of the springs and upon the rim.

It will be noted that each flange member 5 and 6 has its hub portion 7 bearing directly on the axle and the core 10 does not constitute a bearing but serves solely as a spacing device.

What is claimed is:—

In a wheel the combination with a hub comprising a core having flat faces, tubular hub portions at opposite sides of the core and disposed to bear upon an axle, each hub portion having an integral flanged member surrounding the stem, said hub portions being secured to the core; of a felly and spokes secured to and interposed between the hub flanges and the felly, each spoke comprising an elastic unbroken circular portion having opposite faces disposed in parallel planes, and alining screw threaded stems integral with the circular portion and extending therefrom at diametrically opposite points, said stems and the circular portion being disposed in the same plane.

In testimony that I claim the foregoing as my own, I have hereto affixed my signature in the presence of two witnesses.

JOHN EMORY HALLETT.

Witnesses:
A. R. COLLINS,
C. E. HUNTINGTON.